(No Model.)
W. T. ROBINSON.
WHEEL.
No. 486,125. Patented Nov. 15, 1892.
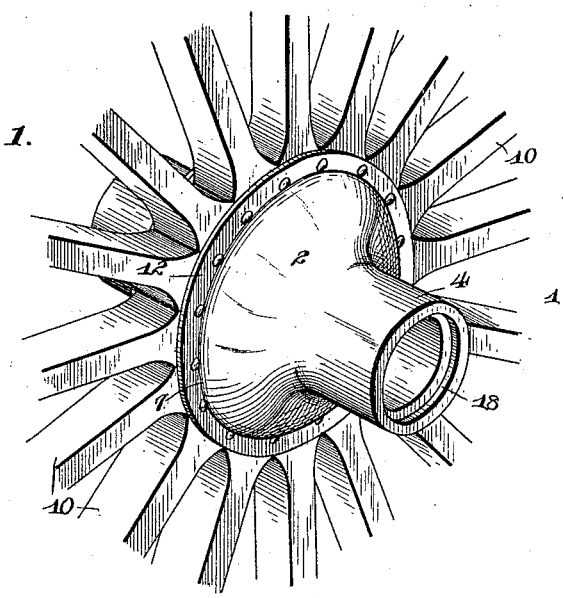
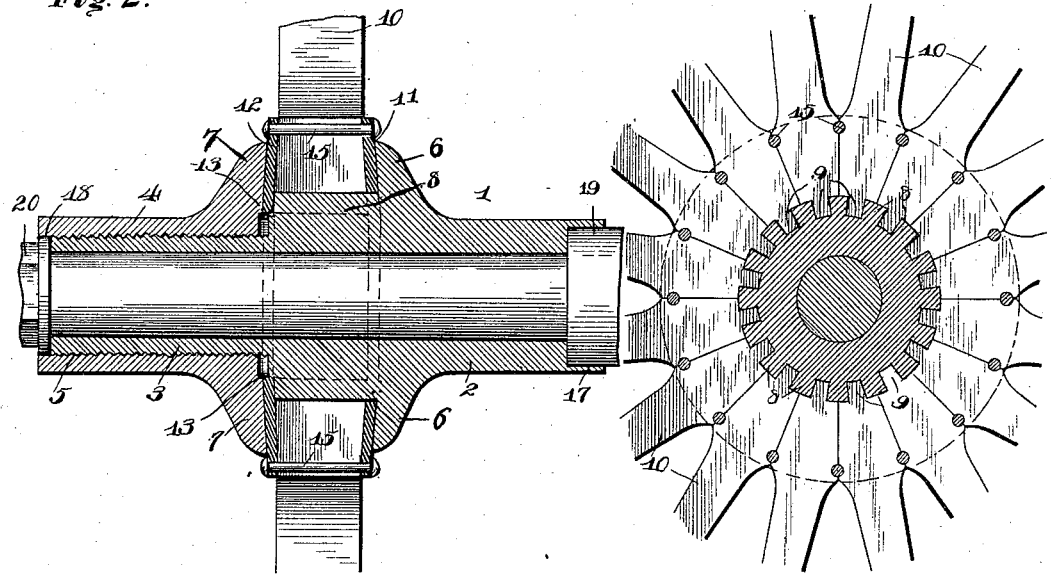
Witnesses
Inventor
W T Robinson
By his Attorneys,

UNITED STATES PATENT OFFICE.

WILLIAM T. ROBINSON, OF BIRMINGHAM, ALABAMA.

WHEEL.

SPECIFICATION forming part of Letters Patent No. 486,125, dated November 15, 1892.

Application filed August 24, 1892. Serial No. 443,976. (No model.)

*To all whom it may concern:*

Be it known that I, WILLIAM T. ROBINSON, a citizen of the United States, residing at Birmingham, in the county of Jefferson and State of Alabama, have invented a new and useful Wheel, of which the following is a specification.

The invention relates to improvements in wheels.

The object of the present invention is to simplify and improve the construction of wheels and to provide one which will be strong and durable and in which the parts may be readily assembled.

The invention consists in the construction and novel combination and arrangement of parts hereinafter fully described, illustrated in the accompanying drawings, and pointed out in the claim hereto appended.

In the drawings, Figure 1 is a perspective view of a portion of a wheel constructed in accordance with this invention. Fig. 2 is a section taken longitudinally of the hub. Fig. 3 is a similar view taken transversely of the hub.

Like numerals of reference indicate corresponding parts in all the figures of the drawings.

1 designates a metal hub, which consists of a section 2, formed integral with an axle-box 3, and a removable interiorly-threaded section 4, adapted to screw on the threaded portion 5 of the axle-box to clamp the spokes between flanges 6 and 7 of the hub-sections. The threaded portion 5 of the axle-box is at the outer end of the latter, and between the said threaded portion and the section 2 of the hub is arranged an annular series of beveled projections 8, which form mortises in which are arranged tenons 9 of spokes 10, whereby the latter are securely fastened to the hub. Between the flanges 6 and 7 of the sections of the hub and the side faces of the inner beveled ends of the spokes, which are wedge-shaped laterally, are interposed circular slightly-conical or flaring securing-plates 11 and 12, the outer one of which is arranged on an annular shoulder 13, and the removable section is screwed up against the annular shoulder 13 and the outer securing-plate 12. These circular securing-plates are pierced at intervals to receive rivets 15, which pass through the wheel between the spokes, which are thereby securely fastened and keyed in place. The perforations of the circular securing-plates are arranged outside of the flanges 6 and 7 of the sections of the hub in order to enable the final fastening of the spokes by the rivets to be made after the spokes, the securing-plates, and the removable hub-sections are in proper position, which is of great advantage. The ends of the axle-box portion of the hub are recessed at 17 and 18 to receive the shoulder 19 of an axle and a nut 20 for securing the spindle of the axle in the hub.

It will be seen that the wheel is simple and comparatively-inexpensive in construction, that it is strong and durable, and that the parts may be readily assembled.

What I claim is—

In a wheel, the combination of the hub-section 2, provided with an annular flange 6 and having an integral axle-box, the latter having its outer portion threaded and provided between the threaded portion and the annular flange with an annular shoulder and with a series of integral beveled projections forming mortises, the spokes having tapered inner ends laterally wedge-shaped and provided with tenons arranged in said mortises, the interiorly-threaded removable hub-section 4, screwing on the threaded portion of the axle-box and provided at its inner end with an annular flange 7, the inner and outer circular securing-plates slightly conical or flaring, arranged on the axle-box at the side faces of the ends of the spokes and extending outward beyond the annular flanges and provided with perforations, the outer plate being arranged on said annular shoulder, and the rivets arranged in the perforations of said plates and interposed between the spokes, substantially as and for the purpose described.

In testimony that I claim the foregoing as my own I have hereto affixed my signature in the presence of two witnesses.

WILLIAM T. ROBINSON.

Witnesses:
J. W. WEBB,
GEORGE C. ARRINGTON.